US009291424B2

(12) United States Patent
Tagarro

(10) Patent No.: US 9,291,424 B2
(45) Date of Patent: Mar. 22, 2016

(54) SWITCHABLE CAMERA SYSTEM FOR A FIREARM

(71) Applicant: Arman Christian Tagarro, Blaine, MN (US)

(72) Inventor: Arman Christian Tagarro, Blaine, MN (US)

( * ) Notice: Subject to any disclaimer, the term of this patent is extended or adjusted under 35 U.S.C. 154(b) by 0 days.

(21) Appl. No.: 14/496,487

(22) Filed: Sep. 25, 2014

(65) Prior Publication Data

US 2015/0285586 A1    Oct. 8, 2015

Related U.S. Application Data

(60) Provisional application No. 61/885,792, filed on Oct. 2, 2013.

(51) Int. Cl.
```
H04N 5/232      (2006.01)
F41C 27/00      (2006.01)
H04N 5/225      (2006.01)
H04N 21/63      (2011.01)
H04N 9/09       (2006.01)
F41G 3/16       (2006.01)
```

(52) U.S. Cl.
CPC .............. *F41C 27/00* (2013.01); *F41G 3/165* (2013.01); *H04N 5/2253* (2013.01); *H04N 5/23203* (2013.01); *H04N 9/09* (2013.01); *H04N 21/631* (2013.01)

(58) Field of Classification Search
CPC ................................................. H04N 5/23203
USPC ....................................................... 89/41.17
See application file for complete search history.

(56) References Cited

U.S. PATENT DOCUMENTS

| | | | |
|---|---|---|---|
| 7,841,120 B2 | 11/2010 | Teetzel et al. | |
| 8,279,173 B2 | 10/2012 | Brown et al. | |
| 8,297,173 B1 * | 10/2012 | Teetzel ................... | F41G 3/165 42/111 |
| 2011/0200319 A1 * | 8/2011 | Kravitz .................. | G03B 17/02 396/333 |
| 2014/0153916 A1 * | 6/2014 | Kintner ................ | G03B 17/561 396/419 |

OTHER PUBLICATIONS

Point Grey Ladybug5 technical reference, Point Grey Research Inc, Jan. 21, 2013.*
Hanlon, Mike; New Weapon System Shoots Around Corners, www.gizmag.com/go/2576, references a product unveiled in Dec. 2003, 5 pages.

* cited by examiner

*Primary Examiner* — James Hannett
(74) *Attorney, Agent, or Firm* — Merchant & Gould P.C.

(57) ABSTRACT

Systems, apparatuses, and methods for improving situational awareness for a user of a firearm are disclosed. An example camera system for a firearm includes a camera assembly, display panel, a mounting fixture, and switching mechanism. An example camera assembly includes a plurality of cameras fixedly oriented in a plurality of different directions. An example mounting fixture is secured to the camera assembly and configured to be removably attached to a firearm. An example switch is configured to select between the plurality of cameras to cause an image from the selected camera to be displayed on the display panel. An example method includes activating a firearm-mounted camera system, receiving a switch input from a user selecting a camera, generating an image of a portion of an environment with the selected camera, and displaying the image on a display panel to alert the user to conditions in the portion of the environment.

19 Claims, 18 Drawing Sheets

SWITCHABLE CAMERA SYSTEM FOR A FIREARM

CROSS REFERENCE TO RELATED APPLICATION

This application claims priority to U.S. Ser. No. 61/885,792, titled SWITCHABLE CAMERA SYSTEM FOR A FIREARM, filed on Oct. 2, 2013, the disclosure of which is hereby incorporated by reference in its entirety.

BACKGROUND

Military and law enforcement personnel often enter and search unknown operating environments, such as homes or buildings. In some situations, the unknown operating environment may include dangerous adversaries, such as armed criminals or enemy combatants. In many cases, military and law enforcement will search these environments with a firearm for protection and to help in apprehending the adversary or otherwise achieving a defined objective.

Searching these unknown operating environments can be dangerous for military or law enforcement personnel. This danger is amplified at potential ambush points where the military or law enforcement personnel's view of the environment may be obstructed by, for example, a wall or ceiling. Examples of ambush points include corners, doorways, and entrances to attics. In these situations, military and law enforcement personnel have few options to check for an adversary hidden by the obstruction.

SUMMARY

In general terms, this disclosure is directed to a switchable camera system for a firearm. In one possible configuration and by non-limiting example, the camera system allows the user to see into potential ambush points (e.g., around corners and above surfaces) before entering the ambush point and risking attack.

One aspect is a camera system for a firearm comprising: a camera assembly including a plurality of cameras fixedly oriented in a plurality of different directions, the plurality of cameras configured to generate a plurality of image signals; a display assembly including a display panel; a mounting fixture secured to the camera assembly, the mounting fixture configured to be removably attached to a firearm; and a switch configured to select between the plurality of cameras to display one of the plurality of image signals on the display panel.

Another aspect is a camera and firearm assembly comprising: a firearm; a camera assembly secured to the firearm and including at least three cameras, each of the cameras generating a video signal; a switch, the switch being configured to select one of the video signals; and a display panel secured to the firearm and configured to display the selected one of the video signals.

Yet another aspect is a method of improving situational awareness for a user of a firearm, the method comprising: activating a firearm-mounted camera system including a display panel and a plurality of cameras fixedly oriented in a plurality of different directions, the cameras being positioned about the forward end of a firearm; receiving a switch input from a user selecting one of the cameras; generating an image of a portion of an environment with the selected one of the cameras; and displaying the image of the portion of the environment on the display panel to alert the user to conditions in the portion of the environment.

Another aspect is a camera system for a firearm comprising: a camera assembly including a plurality of cameras oriented in different directions, the plurality of cameras generating a plurality of images; a display panel including a display device; a mounting fixture secured to the camera assembly, the mounting fixture configured to be removably attached to a firearm; and a switch configured to select between the plurality of cameras to present one of the respective images on the display device.

Yet another aspect is a camera and firearm assembly comprising: a firearm; a camera assembly secured to the firearm and including at least two cameras, each of the cameras generating a video signal; a switch, the switch being configured to select one of the video signals; and a display panel secured to the firearm and configured to display the selected one of the video signals.

Another aspect is a method of approaching a potential ambush point comprising: approaching the end of an obstruction; positioning a camera assembly of a firearm-mounted camera system beyond the obstruction; viewing a screen of the firearm-mounted camera system; and looking for a visible representation on the screen of an object of interest.

A further aspect is a method of improving situational awareness for a user of a firearm, the method comprising: activating a firearm-mounted camera system including a display device and a plurality of cameras oriented in different directions, the cameras being positioned about the forward end of a firearm; receiving a switch input from a user selecting one of the cameras; detecting an image of an object with the selected one of the cameras; and displaying the image of the object on the display device to alert the user to the presence of the object.

DESCRIPTION OF THE DRAWINGS

Aspects of the disclosure may be more completely understood in consideration of the following detailed description of various embodiments of the disclosure in connection with the accompanying drawings.

DETAILED DESCRIPTION

The example embodiments described in the following disclosure are provided by way of illustration only and should not be construed as limiting. Various modifications and changes may be made to the example embodiments described below without departing from the true spirit and scope of the disclosure.

The present disclosure relates generally to a switchable camera system for a firearm. The camera system is switchable because it includes multiple cameras and a switch to select among them. In some embodiments, for example, the camera system allows the user to see into potential ambush points (e.g., around corners and above surfaces) before entering the ambush point and risking attack. Additionally, the camera system allows the user to search under and inside possible hide locations, such as inside a boat, dumpster, or car, for a potentially dangerous person or animal.

Figure 1:
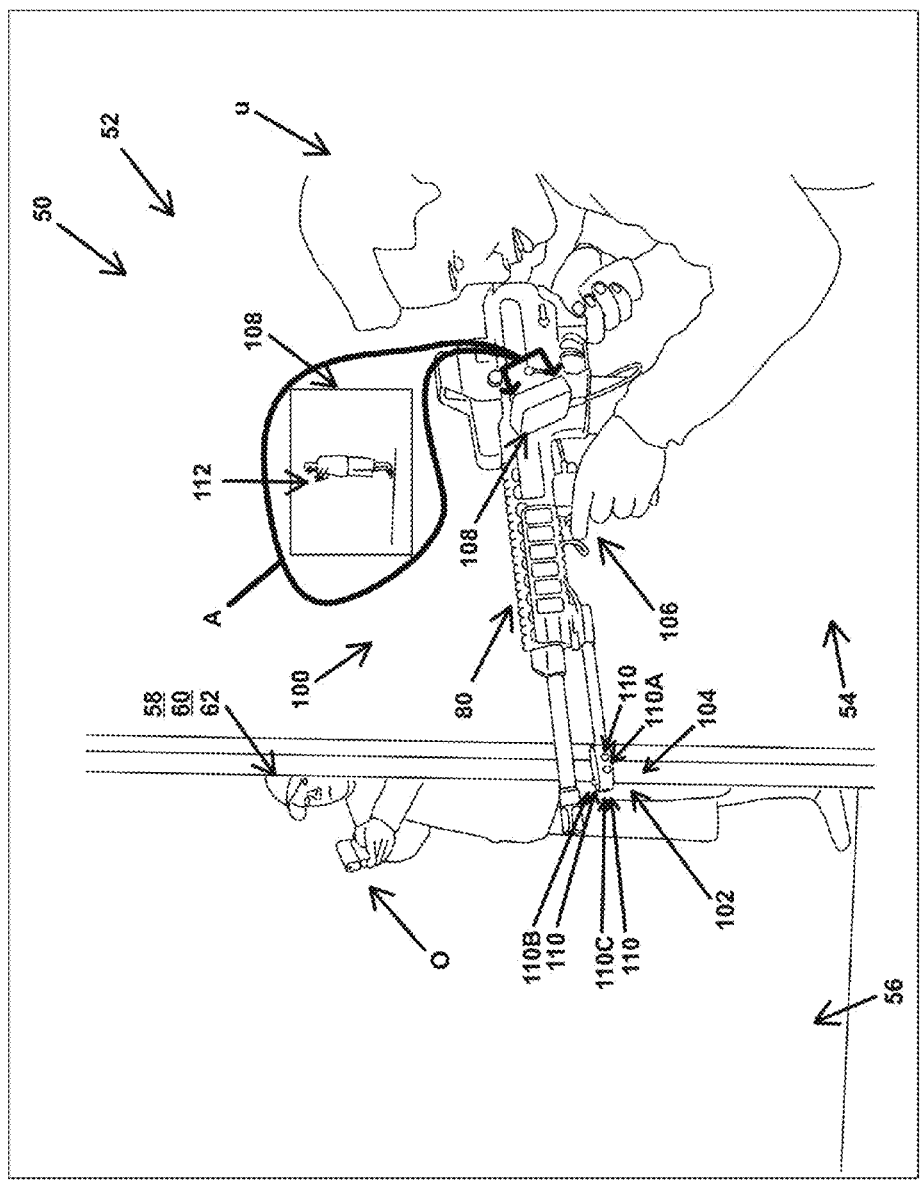
FIG. 1 is a diagram depicting an example operating environment in which a firearm-mounted camera system can be used.
Figure 2:
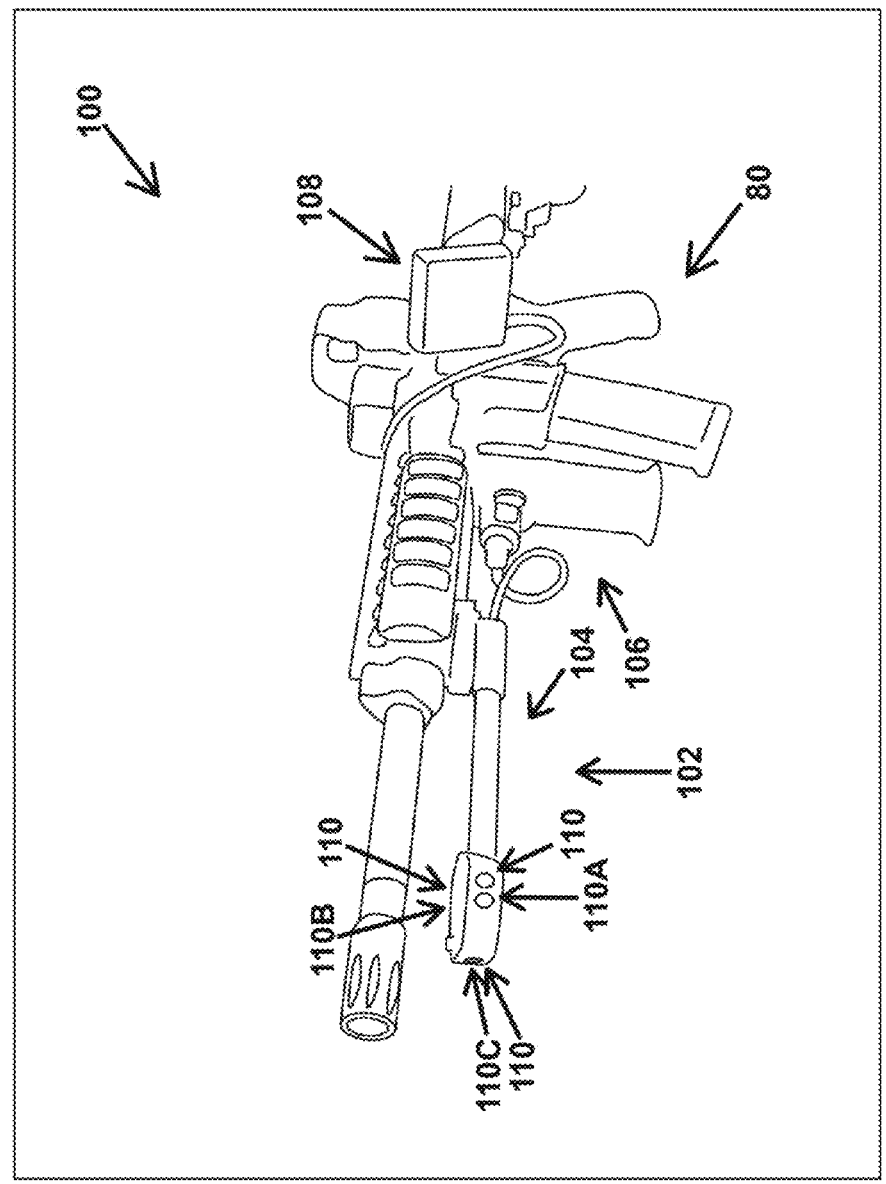
FIG. 2 is a perspective view of the example firearm-mounted camera system of FIG. 1.

FIGS. 1 and 2 depict an example firearm-mounted camera system 100. FIG. 1 is a diagram depicting an example operating environment 50 in which a firearm-mounted camera system 100 can be used. FIG. 2 is a perspective view of the example firearm-mounted camera system 100.

The example operating environment of FIG. 1 includes a portion 52 of a building, a user U of the firearm-mounted camera system 100, and an object O of interest.

In this example, the portion 52 of the building includes a passageway 54, a passageway 56, and an obstruction 58. The user U is located in passageway 54, while the object O of interest, such as an armed adversary, is located in passageway 56. The object O of interest is obstructed from the view of user U by an obstruction 58. In this example, the obstruction includes a wall 60 that terminates at a corner 62. To improve situational awareness, it is desirable for the user U to know whether or not an object O of interest is present behind the obstruction 58 to permit the user U to react accordingly.

The firearm-mounted camera system 100 includes a firearm 80 and a camera system 102.

The firearm 80 is a type of weapon arranged and configured to fire a projectile. Examples of the firearm 80 include handguns and long guns, such as rifles or shotguns. The firearm 80 can be of a variety of different actions, including manual, semi-automatic, or fully automatic. The firearm 80 can be a tactical firearm with a pistol grip, rail mount, bayonet mount, or flashlight mount, or one that can be configured as such. Examples include AR-type rifles, like the AR-15, manufactured by Colt's Manufacturing Company, LLC, of Hartford, Conn., M16 rifle, M4 Carbine manufactured by Colt's Manufacturing Company, LLC of Hartford, Conn. and variants, M14 rifle manufactured by Springfield Armory, Inc. of Geneseo, Ill. and variants, such as the G3 manufactured by Heckler & Koch GmbH, of Oberndorf am Neckar, Germany, the MP5 manufactured by Heckler & Koch GmbH, of Oberndorf am Neckar, Germany, and the Uzi manufactured by Israel Military Industries, of Ramat HaSharon, Israel, or semi-automatic or pump-action shotguns.

In some embodiments, the camera system 102 includes a camera assembly 104, a switching mechanism 106, and a display assembly 108. The camera system 102 is configured to be mounted to the firearm 80.

The camera assembly 104 includes at least one camera 110. The camera 110 operates to detect light representing an image and convert the detected light into electrical signals. Some embodiments include multiple cameras 110, such as three cameras 110A, 110B, and 110C that each face in different directions. Examples of the camera assembly 104 are illustrated and described in more detail herein with reference to FIGS. 3-6.

The switching mechanism 106 is provided to perform receiving input from the user U, and upon receipt of the input, to perform one or more switching operations. For example, when multiple cameras 110A, 110B, and 110C are present, the switching mechanism 106 can be used to select between the various cameras 110A, 110B, and 110C. Examples of the switching mechanism 106 are illustrated and described in more detail herein with reference to FIGS. 7-8.

The display assembly 108 generates a visible representation 112 of the image captured by one or more of the cameras 110 of the camera system 100. The graphical depiction A in FIG. 1 illustrates the view from the perspective of the user U in the illustrated scenario. Examples of the display assembly 108 are described in more detail herein with reference to FIGS. 9-13.

When the firearm-mounted camera system 100 is utilized in the manner shown in FIG. 1, the user approaches the end of the obstruction at the corner 62, and positions the firearm 80 so that the camera 110 of the camera assembly 104 mounted thereon extends past the corner 62. Upon doing so, the image detected by the camera 110 is displayed as the visible representation 112 by the display assembly 108 to the user U. An image of the object O of interest is also detected by the camera 110 and included in the visible representation 112 to alert the user U to the presence of the object O. In this way, the situational awareness of the user U is improved to permit the user to react appropriately.

Figure 3:
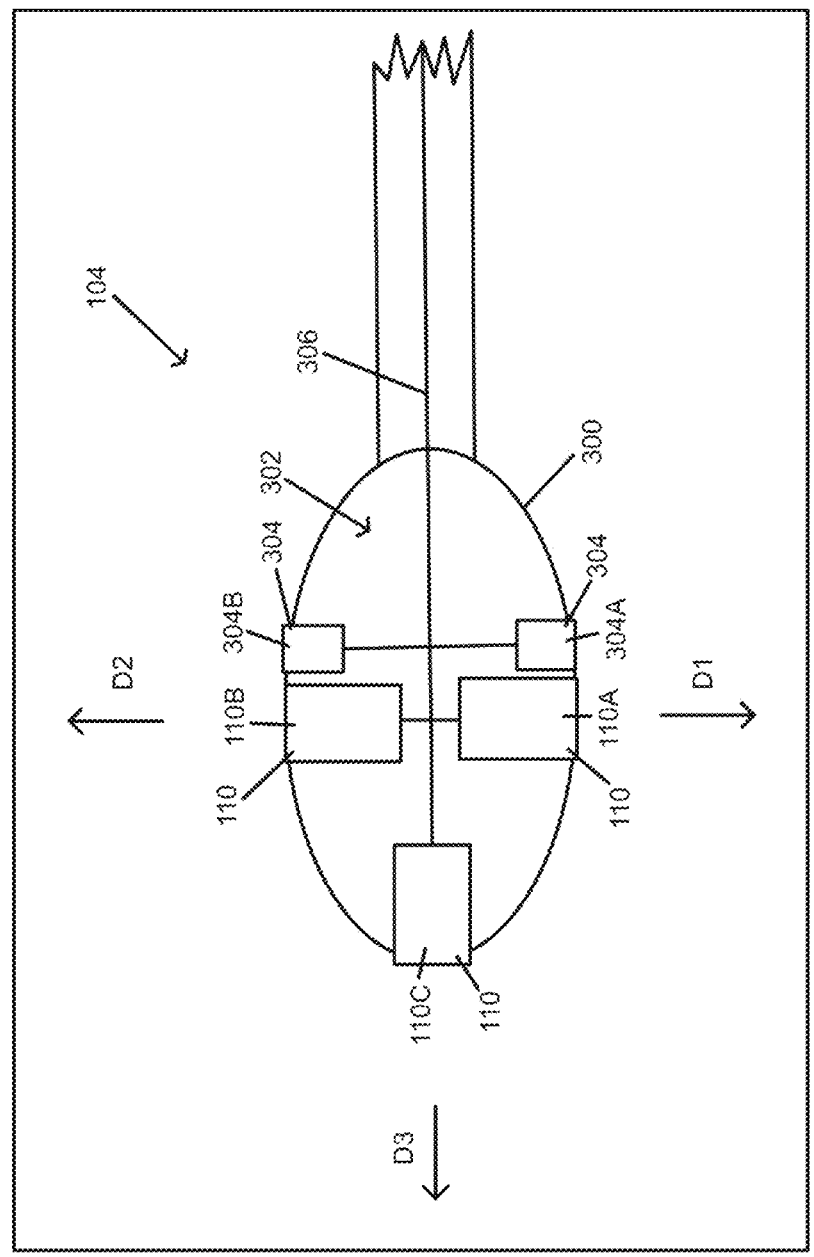
FIG. 3 is a schematic diagram of an example camera assembly of a firearm-mounted camera system.

FIG. 3 is a schematic diagram of an example camera assembly 104. In some embodiments, camera assembly 104 includes enclosure 300, interior volume 302, and camera 110. In some embodiments, camera assembly 104 includes multiple cameras 110A, 110B, and 110C. In some embodiments, camera assembly 104 also includes infrared emitters 304A and 304B.

Enclosure 300 is a hollow, cylindrical shell formed from plastic, metal, rubber, or any other suitable material in some embodiments. In some embodiments the enclosure 300 forms a head assembly of the camera assembly 104. Enclosure 300 defines an interior volume 302. Enclosure 300 includes at least one optical path, such as an aperture, through which camera 110 is directed. In some embodiments, Enclosure 300 includes additional optical paths through which additional cameras may be directed. Additionally, in some embodiments, enclosure 300 includes one or more infrared paths, such as the areas defined by apertures, through which infrared emitters, such as infrared emitters 304A or 304B, are directed.

Interior volume 302 is the volume surrounded by and defined by the enclosure 300. At least some of the components of the camera assembly, including camera 110, are disposed in interior volume 302. In some embodiments, multiple cameras, such as cameras 110A, 110B, and 110C, are disposed in interior volume 302. Additionally, in some embodiments, infrared emitters 304A and 304B are also disposed in interior volume 302. The wiring assembly 306 for cameras 110A, 110B, and 110C and infrared emitters 304A and 304B connects to these parts and extends through and out from the interior volume 302. In some embodiments, interior volume 302 is filled with a substance, such as epoxy, to ruggedize camera assembly 104 by surrounding the wiring and components to minimize shifting and movement.

Cameras 110A, 110B, and 110C operate to detect light and convert the detected light into electrical signals representing the image detected from the light. These electrical signals are examples of image signals. In some embodiments, cameras 110A, 110B, and 110C also operate to detect infrared light. In other embodiments, cameras 110A, 110B, and 110C operate to detect both optical light and infrared light. The cameras 110A, 110B, and 110C can be configured to use a variety of image capture sensors, including charge-coupled devices, complementary metal-oxide-semiconductors, or any other means of capturing images. In some embodiments, cameras 110A, 110B, and 110C are digital video cameras.

Cameras 110A, 110B, and 110C are at least partially contained within enclosure 300 and are directed through one or more optical or infrared paths through enclosure 300, such as an area defined by an aperture. Cameras 110A, 110B, and 110C are directed in different directions relative to each other. In FIG. 3, cameras 110A and 110B are directed in opposite directions, D1 and D2, and are configured to aim out from the sides of a firearm. By contrast, Camera 110C is directed in direction D3 and configured to aim out from the front of the firearm.

Infrared emitters 304A and 304B operate to emit electromagnetic radiation, such as near infrared light. Near-infrared light is electromagnetic radiation with a wavelength from 0.78-3 μm. Near-infrared light is not visible to the human eye. Infrared emitters 304A and 304B can be configured to use any technology that emits infrared light, such as a light emitting diode.

Infrared emitters 304A and 304B are at least partially contained within enclosure 300. Infrared emitters 304A and 304B are directed towards one or more infrared paths through enclosure 300, such as the area defined by an aperture, which directs infrared light out to the environment proximate to camera assembly 104. This infrared light is not detected by the human eye, but is detected by cameras 110A, 110B, and 110C in some embodiments. In some embodiments, an additional infrared emitter is included and directed towards the front of the firearm. Other embodiments include additional infrared emitters to illuminate a wide field of view with infrared light. In this manner, camera assembly 104 provides covert, night-vision capabilities.

Although, the example camera assembly 104 of FIG. 3 includes three cameras, some embodiments may include more or fewer than three cameras. Similarly, some embodiments may include more or fewer than the two infrared emitters included in the example embodiment of camera assembly 104 shown in FIG. 3.

Figure 4:
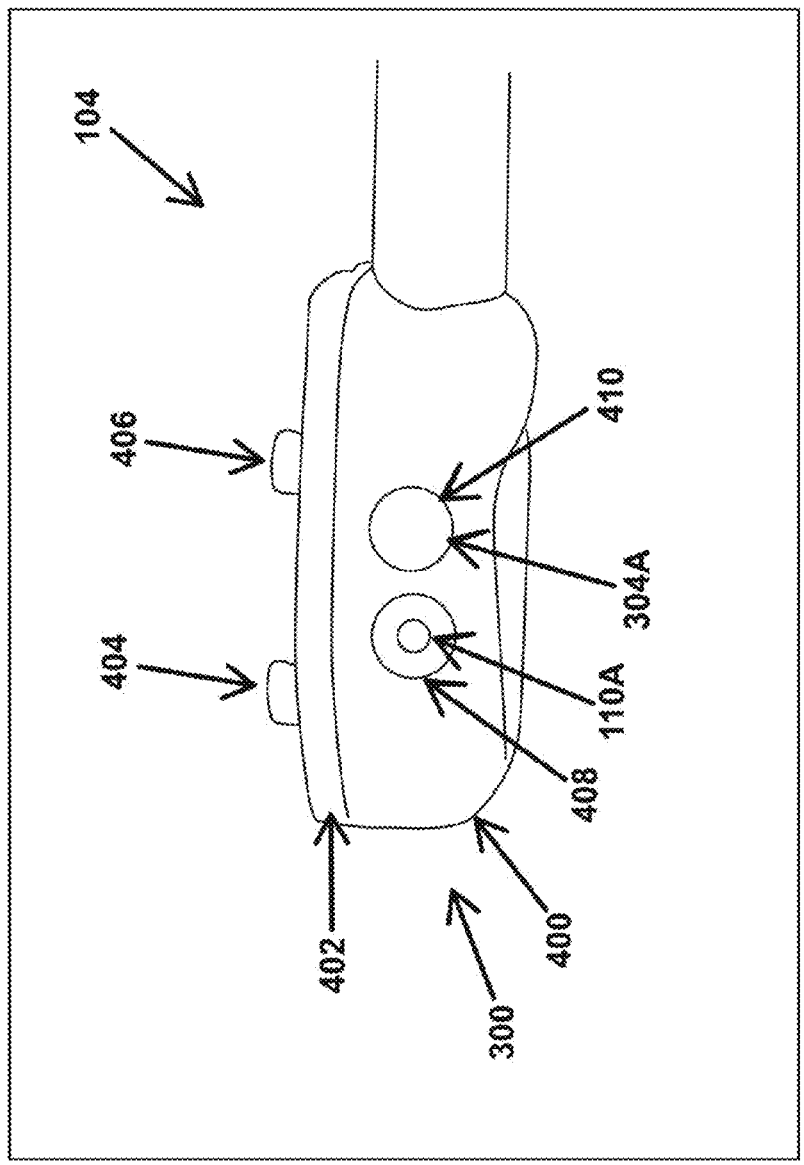
FIG. 4 is a side view of the enclosure of the camera assembly of the example firearm-mounted camera system of FIG. 1.

FIG. 4 is a side view of enclosure 300 of the example camera assembly 104. Enclosure 300 includes base 400, cover 402, fasteners 404 and 406, optical path 408, and infrared path 410.

Base 400 is hollow and cylindrical with a closed bottom surface and an opening on top. Base 400 is formed from plastic, metal, rubber, or any other suitable material.

Cover 402 is configured to fit on top of base 400 and seal it. Cover 402 is formed from plastic, metal, rubber, or any other suitable material. In some embodiments, cover 402 is formed from the same material as base 400. However, in other embodiments, base 400 and cover 402 are formed from different materials.

Fasteners 404 and 406 operate to secure cover 402 to base 400. Examples of fasteners 404 and 406 include screws and bolts. However, in some embodiments, other means of securing cover 400 to enclosure 300 are used.

Optical path 408 is a portion of the surface of base 400 that operates to permit the passage of optical light. Examples of optical path 408 include the areas defined by apertures, lens, plane glass, and optical filters. In some embodiments, base 400 includes optical path 408 through which camera 110A is directed and receives optical light. In other embodiments, base 400 includes additional optical paths through which additional cameras are directed. Additionally, in some embodiments, optical path 408 operates to permit passage of infrared light as well as optical light.

Infrared path 410 is a portion of the surface of base 400 that operates to permit the passage of infrared light. Examples of infrared path 410 include the areas defined by apertures, lens, plane glass, and optical filters. In some embodiments, base 400 includes infrared path 410 through which infrared emitter 304A is directed and emits infrared light. In other embodiments, base 400 includes additional infrared paths through which additional infrared emitters are directed.

Figure 5:
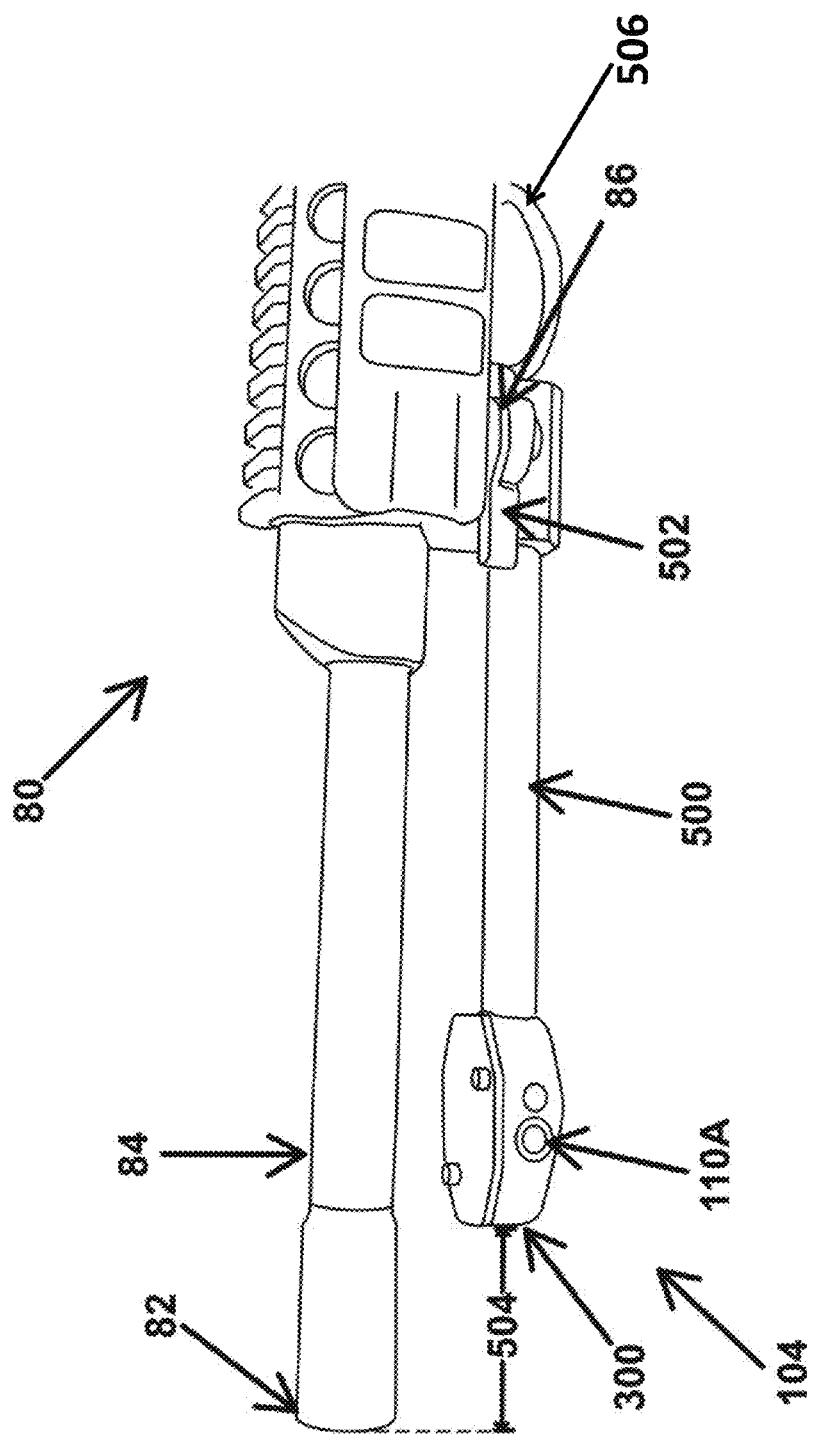
FIG. 5 is a view of the camera assembly of the firearm-mounted camera system of FIG. 1.

FIG. 5 is a view of an example camera assembly 104 mounted on an example firearm 80. Camera assembly 104 includes enclosure 300, beam 500, and mounting fixture 502. In some embodiments, camera assembly 104 also includes cable 506.

Enclosure 300 contains camera 110A and is described in detail in FIGS. 3 and 4.

Beam 500 is a hollow beam or cylinder constructed from a rigid material, such as metal, plastic, or a composite. Beam 500 is secured at a first end to enclosure 300 and at a second end to mounting fixture 502. In some embodiments, beam 500 is disposed in a direction generally parallel to the barrel 84 of firearm 80. In some embodiments, a direction generally parallel to the barrel 84 is a direction that is within one, five, or fifteen degrees of the direction of the barrel 84. Beam 500 positions enclosure 300 near muzzle 82 of firearm 80. In some embodiments, enclosure 300 is set back behind the muzzle 82 by a distance 504 to minimize the effect of muzzle flash and muzzle blast on enclosure 300 when firearm 80 is discharged. In yet other embodiments, the beam 500 is not included. Instead, the enclosure 300 is secured directly to the mounting fixture.

Because enclosure 300 is positioned near muzzle 82 of firearm 80, the user may use camera assembly 104 to see around obstructions while extending only a small portion of firearm 80 beyond the obstruction. Accordingly, this minimizes the risk that the firearm or user's hand will be grabbed by an adversary who is hiding beyond the obstruction.

Mounting fixture 502 is an apparatus that attaches camera assembly 104 to firearm 80. In some embodiments, mounting fixture 502 is configured to attach to a picatinny rail 86, such as with a thumbscrew or a hex screw. In other embodiments, mounting fixture 502 is configured to be removably attached to firearm 80 via other mechanisms, such as a bayonet mount. In yet another embodiment, mounting fixture 502 is permanently secured to firearm 80.

Cable 506 is a cable that operates to carry signals representing images to switching mechanism 106. In some embodiments, cable 506 is an electrical cable. In some embodiments, cable 506 also operates to carry power and control signals from switching mechanism 106 to camera assembly 104. In other embodiments, cable 506 is an optical fiber cable. In some embodiments, cable 506 is partially or completely contained in beam 500. Other embodiments do not include cable 506 at all. In these embodiments, signals representing images may be transmitted to switching mechanism 106 by wireless radio frequency communication or optical beam.

Figure 6:
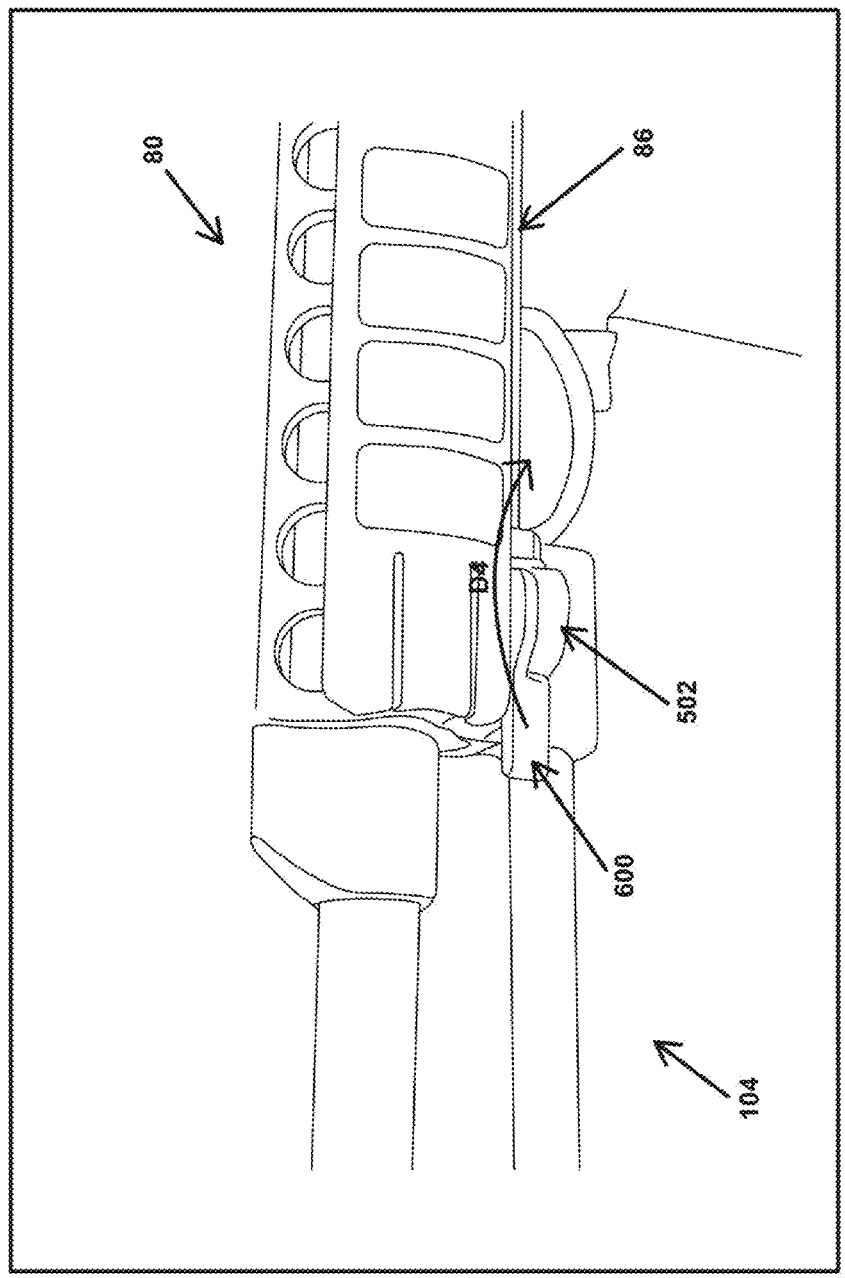
FIG. 6 is a close-up view of the mounting fixture of the camera assembly of the example firearm-mounted camera system of FIG. 1.

FIG. 6 is a close-up view of the mounting fixture 502 of an example camera assembly 104 secured to a firearm 80. Mounting fixture 502 includes lever 600. Mounting fixture 502 is configured to mate with rail 86 when it is removably attached to firearm 80.

Lever 600 is a rigid beam that pivots about a fixed point. Lever 600 operates to secure the mounting fixture 502 to rail 86. Lever 600 is sized to be rotated by hand. As lever 600 is rotated in a first direction, D4, fixture 502 is released from rail 86. Conversely, as lever 600 is rotated in a direction opposite of D4, fixture 502 is secured to rail 86. In other embodiments, mounting fixture 502 is configured to be removably attached to firearm 80 with a thumbscrew or hex screw, rather than a lever.

Figure 7:
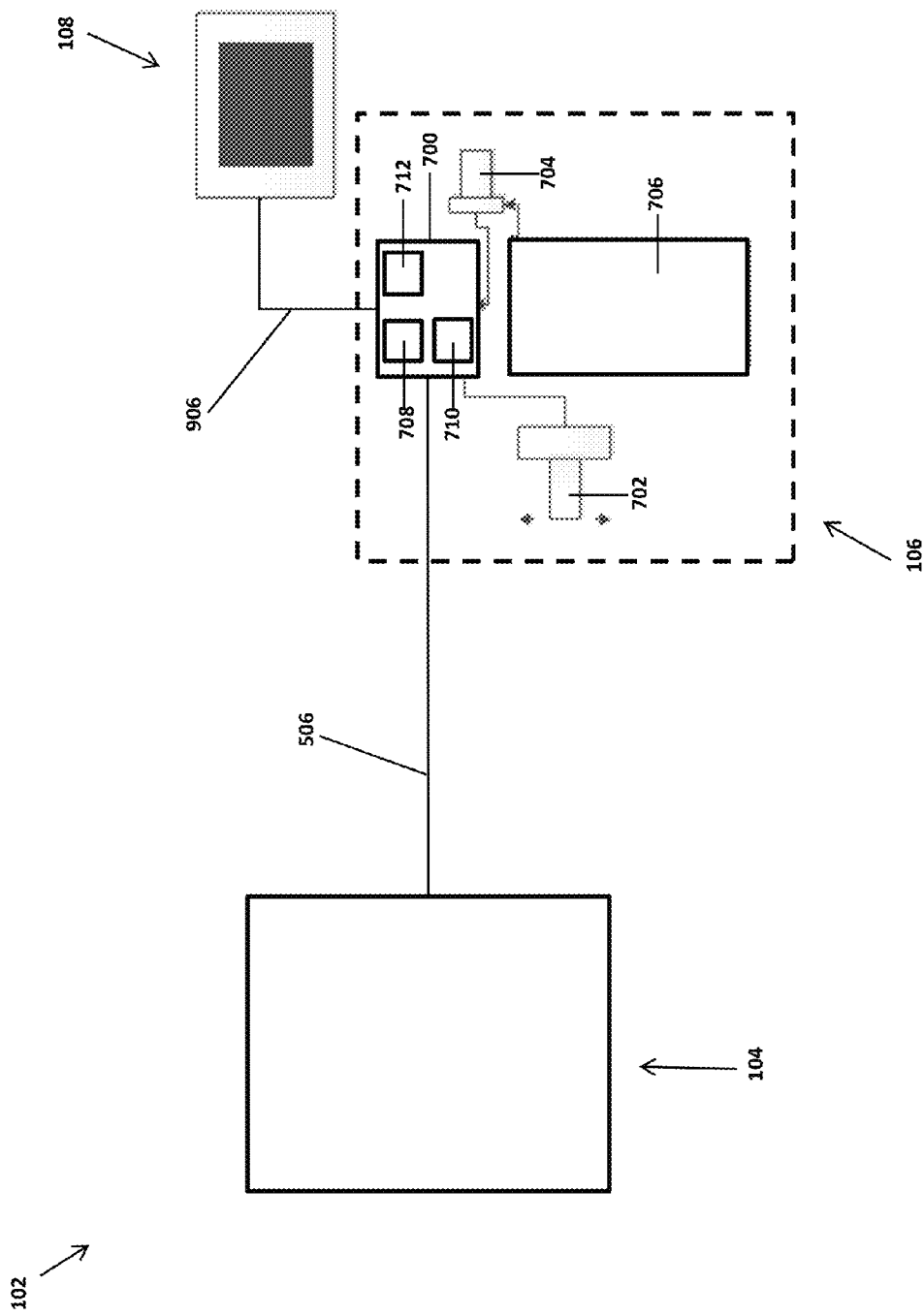
FIG. 7 is a schematic diagram of an example switching mechanism of a firearm-mounted camera system.

FIG. 7 is a schematic diagram of switching mechanism 106 of an example camera system 102. Switching mechanism 106 is in electrical communication with the camera assembly 104 and the display assembly 108. In some embodiments, switching mechanism 106 controls the power signals for camera assembly 104 and display assembly 108. In some embodiments, switching mechanism 106 receives electrical signals representing images from camera assembly 104. Further, in some embodiments, switching mechanism 106 transmits electrical signals representing images to display assembly 108.

In some embodiments, switching mechanism 106 includes control board 700, camera switch 702, power switch 704, and power supply 706.

Control board 700 is an electronic apparatus that receives and transmits electrical signals. Examples of control boards include printed circuit boards, analog signal processors, digital signal processors, and other processing devices. Control board 700 may also be implemented through any other reasonable means of providing control function. In some embodiments, control board 700 includes a processor 708, memory 710, and accelerometer 712.

In some embodiments, control board 700 operates to enable or disable all or some of camera assembly 104 and display assembly 108. In some embodiments, control board 700 operates to direct electronic signals representing images received from camera assembly 104 to display assembly 108. In some embodiments, the processor of control board 700 encodes and stores images received from camera assembly 104 into its memory.

In some embodiments, camera switch 702 is an electromechanical device having multiple states, each state opening or closing an electrical circuit. In some embodiments, camera switch 702 is configured to be mechanically manipulated by hand to switch between states. Camera switch 702 is in electrical communication with control board 700. Based on the current state of camera switch 702, control board 700 operates to select which camera signal from camera assembly 104 is transmitted to display assembly 107. In some embodiments, control board 700 disables or enables one or more cameras of camera assembly 104 based on the state of camera switch 702. Further, in some embodiments, control board 700 disables or enables one or more infrared emitters of camera assembly 104 based on the state of camera switch 702.

In some embodiments, camera switch 702 has three physical positions. Each physical position corresponds to one of the cameras in camera assembly 104. In other embodiments, camera switch 702 may have fewer physical positions than the number of cameras in camera assembly 104. In these embodiments, the switch indicates to control board 700 to loop to the next camera signal received from camera assembly 104. In some embodiments, camera switch 702 is implemented as a potentiometer, similar to a joystick. In these embodiments, a camera is selected by actuating the potentiometer. When the potentiometer is not actuated, a default camera will be selected. Alternatively, in some embodiments, the camera system 102 may be disabled when the potentiometer is not actuated. In other embodiments, camera switch 702 is implemented with one or more buttons or touch sensors. When one of the buttons or touch sensors is activated, a specific camera is selected. Still other embodiments are possible.

In this manner, control board 700 and camera switch 702 operate to allow the user of camera system 102 to select the image that is displayed on display assembly 108 from the images received by the cameras in camera assembly 104.

Figure 14:
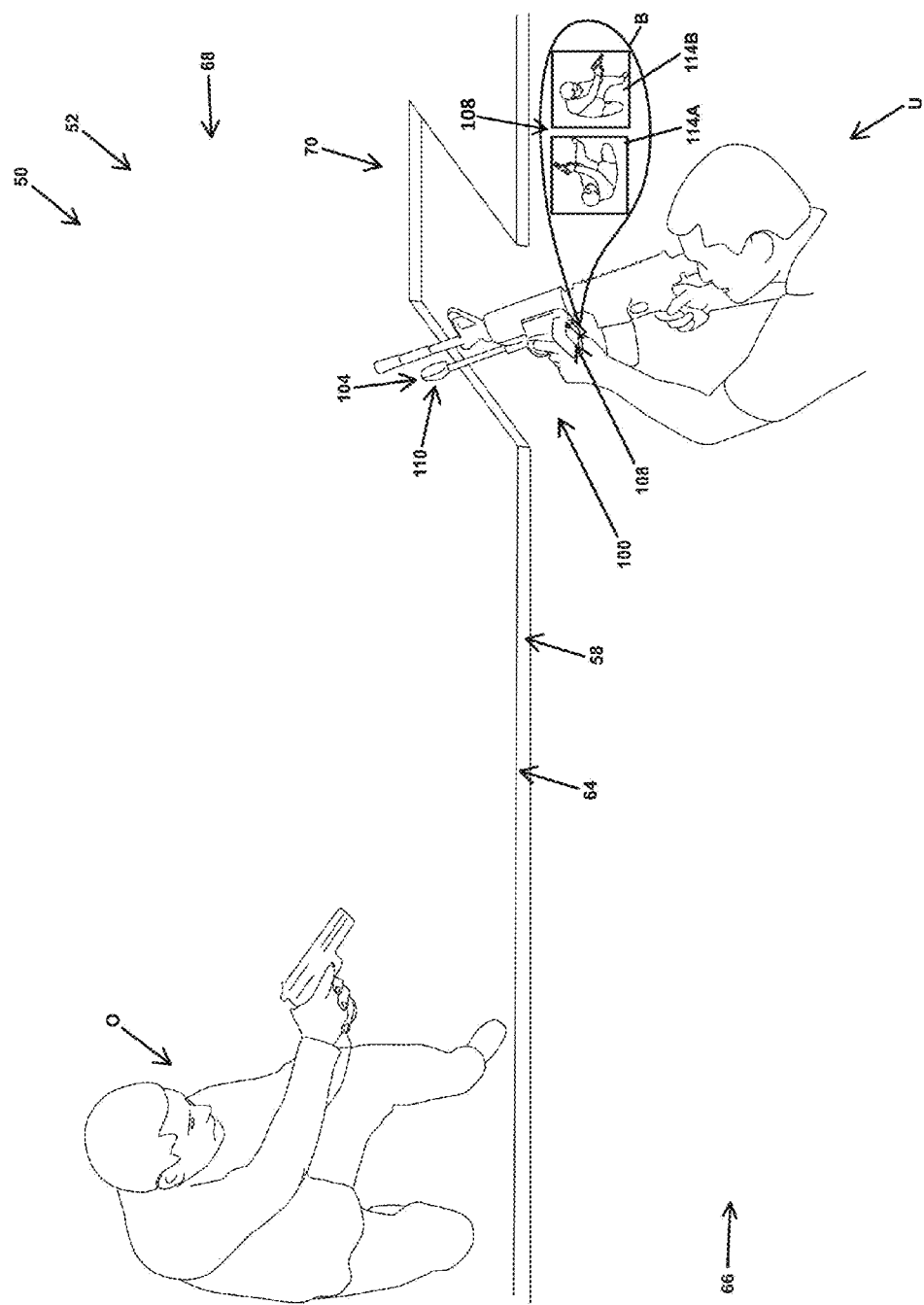
FIG. 14 is a diagram depicting another example operating environment in which a firearm-mounted camera system can be used.

In some embodiments, processor 708 reorients the selected image received by the cameras in camera assembly 104 based on the orientation of the firearm 80 sensed by accelerometer 712. In this manner, the image displayed on display assembly 108 is oriented so that up is at the top of the screen regardless of the orientation of firearm 80. The image reorientation process is illustrated in FIG. 14. In some embodiments, the orientation of the firearm is detected using gyroscope technology, such as a vibrating structure gyroscope. Still other orientation-sensing technologies may be used.

In some embodiments, processor 708 stores some or all of the images received by the cameras in camera assembly 104 to memory 710. The images stored in memory 710 can be used for record-keeping, evidentiary, or other purposes.

Power switch 704 is an electromechanical device configured to turn the camera system 102 on or off. In some embodiments, power switch 704 will have two physical states. The first state completing a circuit and allowing a current to flow; the second state breaking the circuit and preventing the current from flowing. In some embodiments, power switch 704 is a push button switch in which the push button switch toggles (or switches) from a first state to a second state when it is pushed a first time, and toggles (or switches) back to the first state when it is pushed a second time. In other embodiments, power switch 704 may flip or slide from one state to another.

Power supply 706 provides electrical energy to camera system 102. In some embodiments, power supply 706 is a battery. In some embodiments, power supply 706 is in electrical communication with power switch 704. In those embodiments, in one state, power switch 704 completely deprives camera system 102 of power. In other embodiments, power supply 706 is in direct electrical communication with control board 700. In those embodiments, the signal from power switch 704 directs the control board to provide power to display assembly 108 and camera assembly 104.

Figure 8:
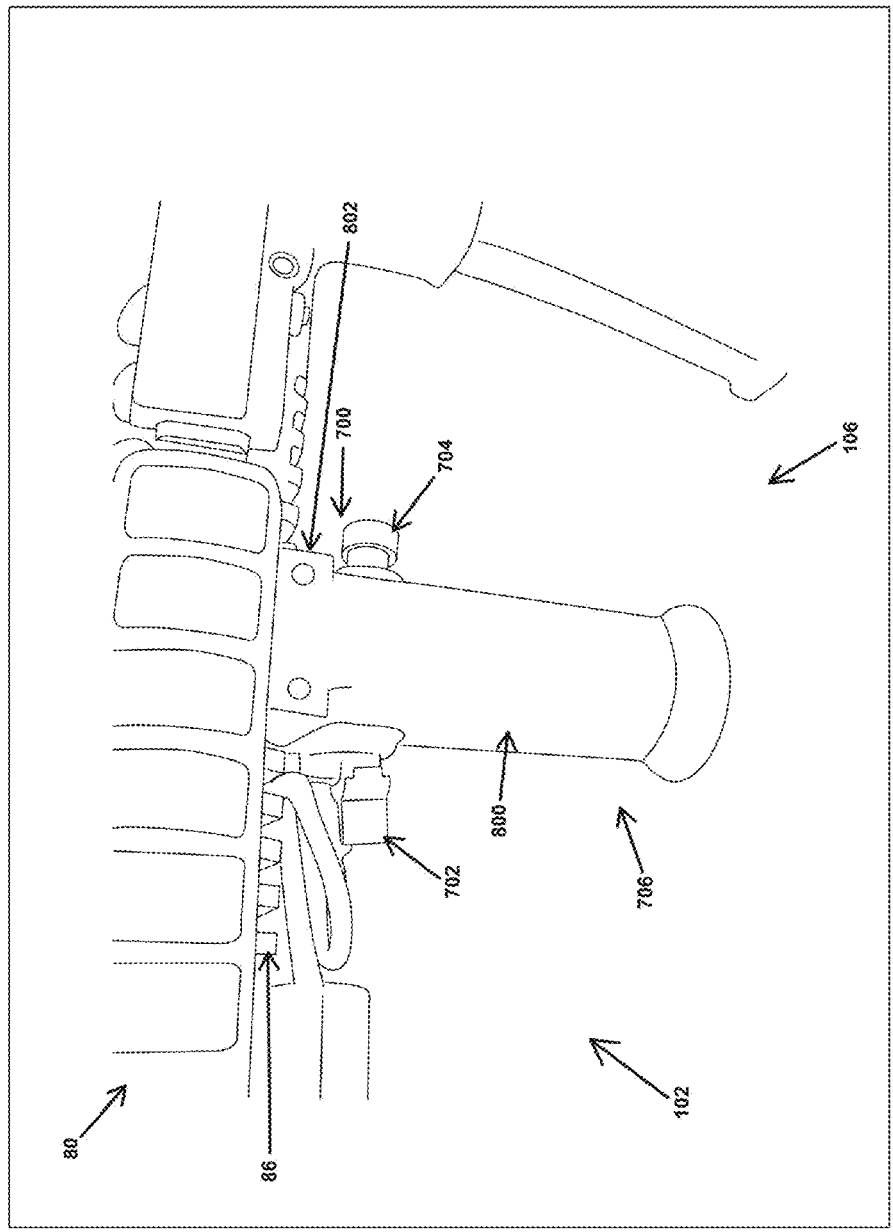
FIG. 8 is a side view of the switching mechanism of the example firearm-mounted camera system of FIG. 1.

FIG. 8 is a side view of switching mechanism 106 mounted to firearm 80. In some embodiments, switching mechanism 106 includes foregrip 800 and mounting fixture 802.

In some embodiments, foregrip 800 is a hollow cylinder formed from a rigid material, such as metal or plastic. In some embodiments, foregrip 800 contains power supply 706 and control board 700. Further, in some embodiments, power switch 704 and camera switch 702 are secured to the exterior of foregrip 800. In some embodiments, foregrip 800 includes an access panel to replace or charge the batteries of power supply 706. In some embodiments, foregrip 800 is configured to perform at least two functions. First, foregrip 800 provides physical protection to the components of switching mechanism 106. Second, foregrip 800 provides a convenient location for the user to hold and control firearm 80 while keeping his or her hand in close proximity to camera switch 702 and power switch 704. Because conveniently located camera switch 702 allows the user to select images for display from camera assembly 104, the user may quickly move from one obstruction to the next without delaying to reconfigure camera system 102.

Mounting fixture 802 is an apparatus that attaches switching mechanism 106 to firearm 80. In some embodiments, mounting fixture 802 is configured to attach to picatinny rails. The mounting fixture 802 may be configured to mount to the picatinny rails at an angle. In other embodiments, mounting fixture 802 is configured to be removably attached to firearm 80 via other mechanisms. In yet another embodiment, mounting fixture 802 is permanently secured to firearm 80.

In some embodiments, mounting fixture 802 is integral with foregrip 800. In other embodiments, mounting fixture 802 is secured to foregrip 800 with a fastener or by another means.

Figure 9:
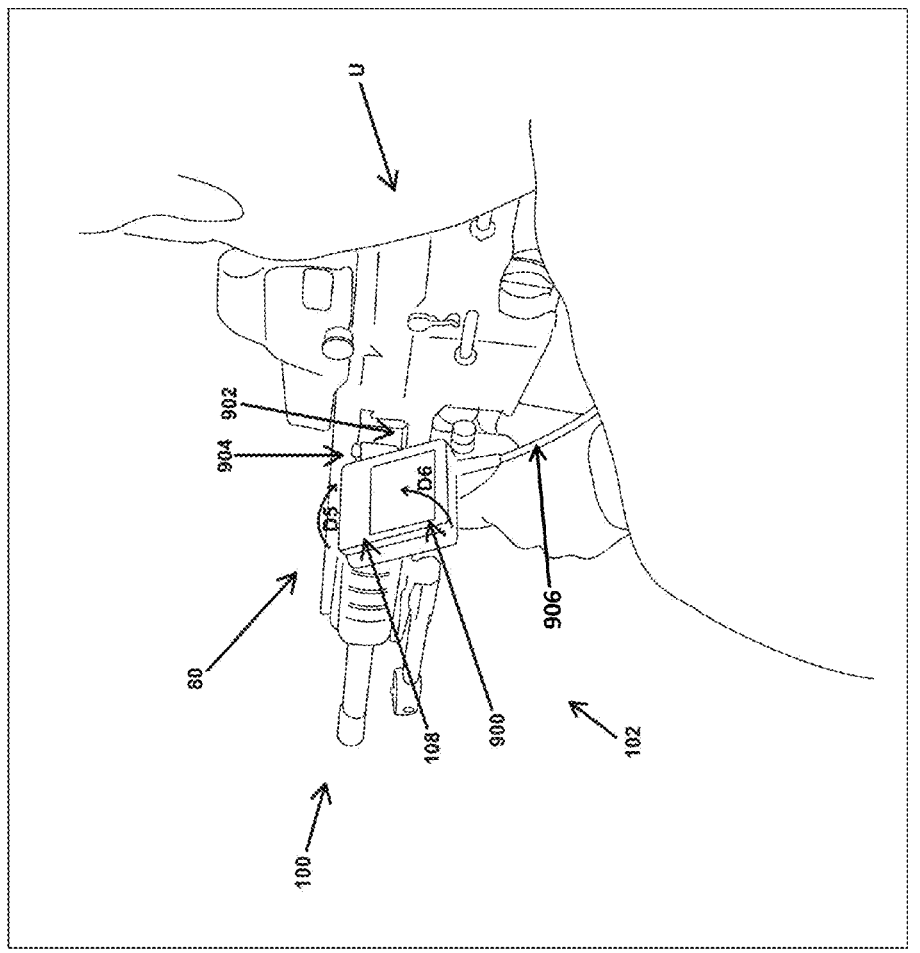
FIG. 9 is a down-barrel, perspective view of the example firearm-mounted camera system of FIG. 1, similar to the typical view from the perspective of a user.

FIG. 9 is a down-barrel, perspective view of the example firearm-mounted camera system 100, similar to the typical view from the perspective of a user U. In this view, display assembly 108 of camera system 102 is shown as mounted on firearm 80 and held by user U.

Display assembly 108 includes screen 900, hinge 902, pivot point 904, and cable 906. Additionally, in some embodiments display assembly 108 includes the power supply 706 and control board 700.

In some embodiments, screen 900 is a liquid crystal display. In other embodiments, screen 900 is a light-emitting diode display. Still other embodiments of screen 900 are possible as well. Screen 900 operates to receive an electrical signal representing an image and display that image.

Figure 11:
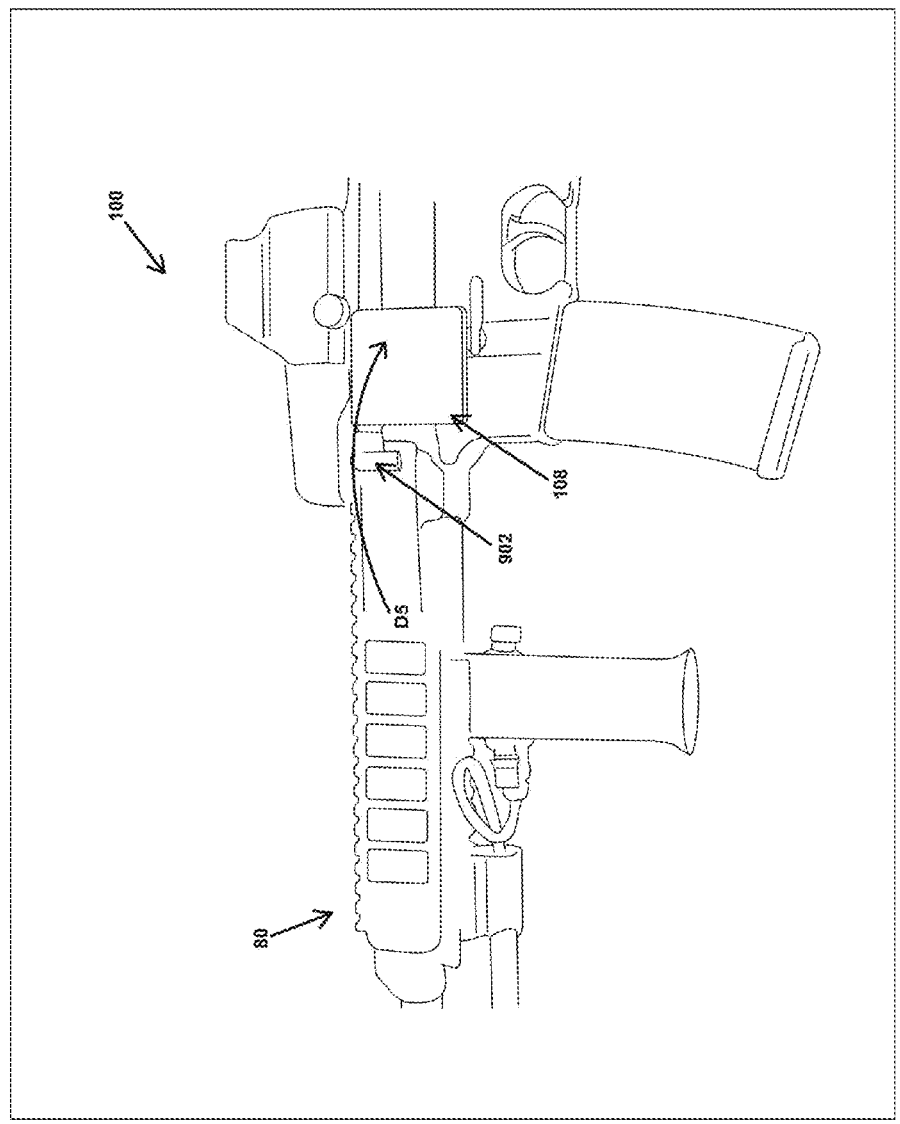
FIG. 11 is a side view of the display assembly of the example firearm-mounted camera system of FIG. 1 in a closed position.

In some embodiments, hinge 902 is a barrel hinge. Hinge 902 is configured to allow display assembly 108 and screen 900 to be rotated in a direction D5 towards or in the opposite direction away from the user (direction D5 is also illustrated in FIG. 11). When screen 900 is fully rotated towards the user, it faces the body of firearm 80 and does not significantly interfere with the view of user U. Display assembly 108 can also be rotated away from the user so that screen 900 faces out in the direction of the side of firearm 80 and may be viewed from the side of firearm 80. In this manner, user U may quickly configure camera system 102 to be used or hidden from view without delay for physical attachment or removal of components.

Pivot point 904 is a mechanical joint that operates to allow screen 900 to be rotated up in direction D6 or down in the opposite direction. In combination with hinge 902, pivot point 904 operates to allow user U to adjust the orientation of screen 900 to optimize viewing and minimize interference with user U's field of view.

Cable 906 is a cable that operates to carry signals representing images to screen 900. In some embodiments, cable 906 is an electrical cable. In some embodiments, cable 906 also operates to carry power and control signals to screen 900 or other components of display assembly 108. In other embodiments, cable 906 is an optical fiber cable. Other embodiments do not include cable 906 at all. In these embodiments, signals representing images may be transmitted to screen 900 by wireless radio frequency communication or optical beam.

Figure 10:
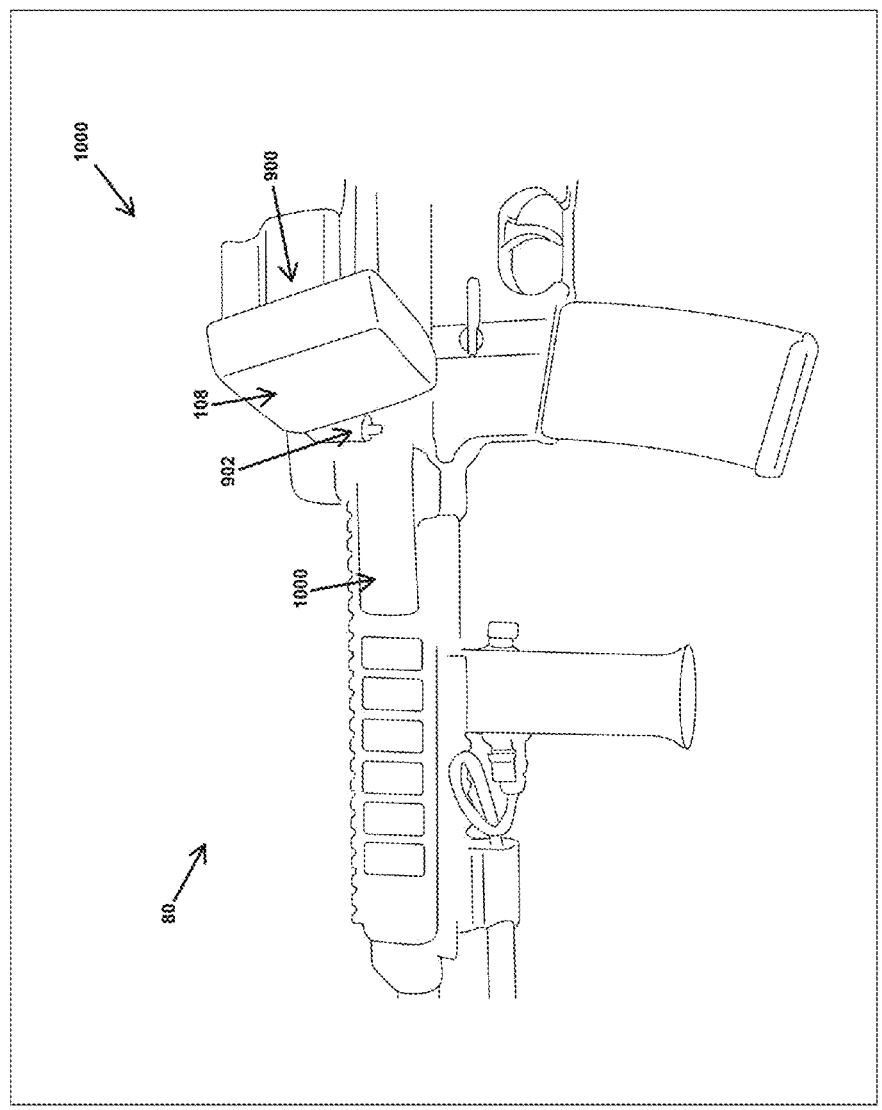
FIG. 10 is a side view of an example display assembly of the example firearm-mounted camera system of FIG. 1 rotated by approximately 90 degrees in an open position.

FIG. 10 is a side view of an example display assembly 108 of a firearm-mounted camera system 100. Display assembly 108 includes mounting fixture 1000.

Mounting fixture 1000 is an apparatus that attaches display assembly 108 to firearm 80. In some embodiments, mounting fixture 1000 is configured to attach to picatinny rails. The mounting fixture 1000 may be configured to mount to the picatinny rails at an angle. In other embodiments, mounting fixture 1000 is configured to be removably attached to firearm 80 via other mechanisms. In yet another embodiment, mounting fixture 1000 is permanently secured to firearm 80.

Mounting fixture 1000 is secured to hinge 902. In some embodiments, mounting fixture 1000 is integral with hinge 902. In other embodiments, mounting fixture 1000 is secured to hinge 902 with a screw, bolt, or other appropriate fastener.

FIG. 11 is a side view of display assembly 108 of an example firearm-mounted camera system 100. In this figure, display assembly 108 is rotated in direction D5 about hinge 902 into a fully closed position. In a fully closed position, the screen of display assembly 108 faces and abuts the side of firearm 80. In this position, the screen and display assembly 108 minimally interfere with the field of view and situational awareness of the user of firearm 80.

Figure 12:
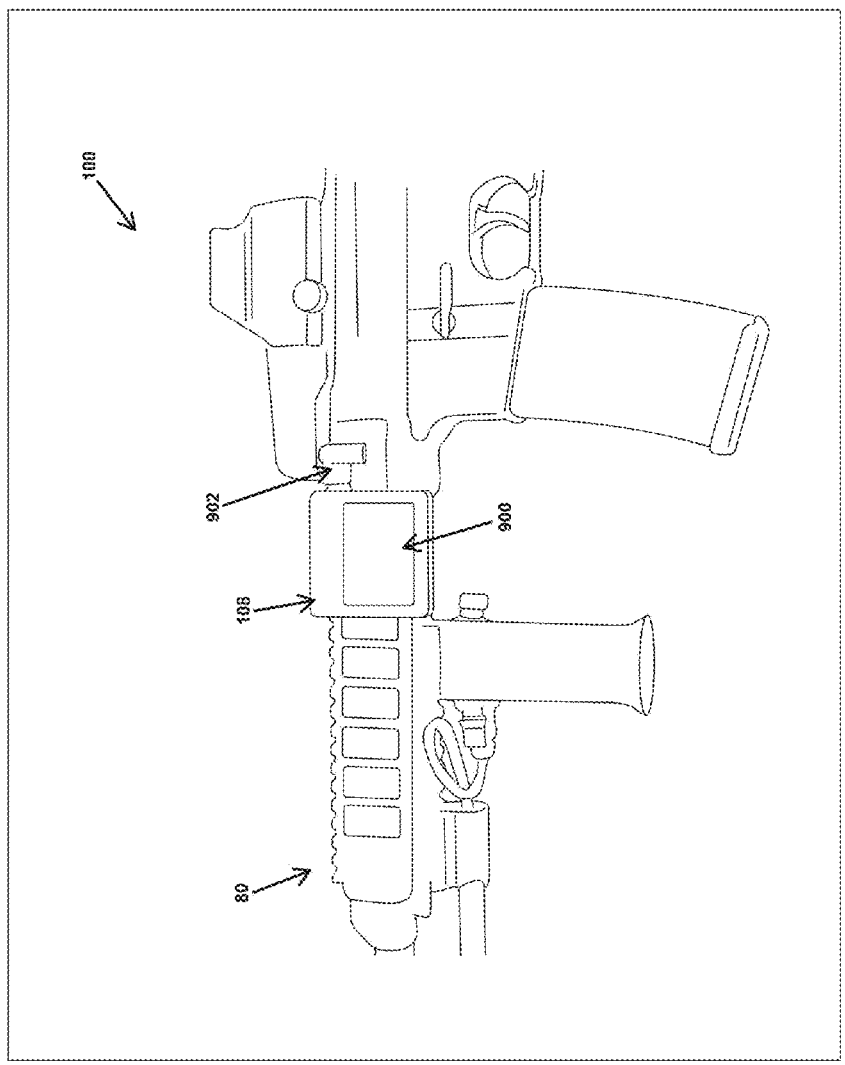
FIG. 12 is a side view of the display assembly of the example firearm-mounted camera system of FIG. 1 rotated by approximately 180 degrees in an open position.

FIG. 12 is another side view of display assembly 108 of an example firearm-mounted camera system 100. In this view, the display assembly 108 is rotated about hinge 902 into a fully open position. In this position, screen 900 may be viewed from the side of firearm 80.

Figure 13:
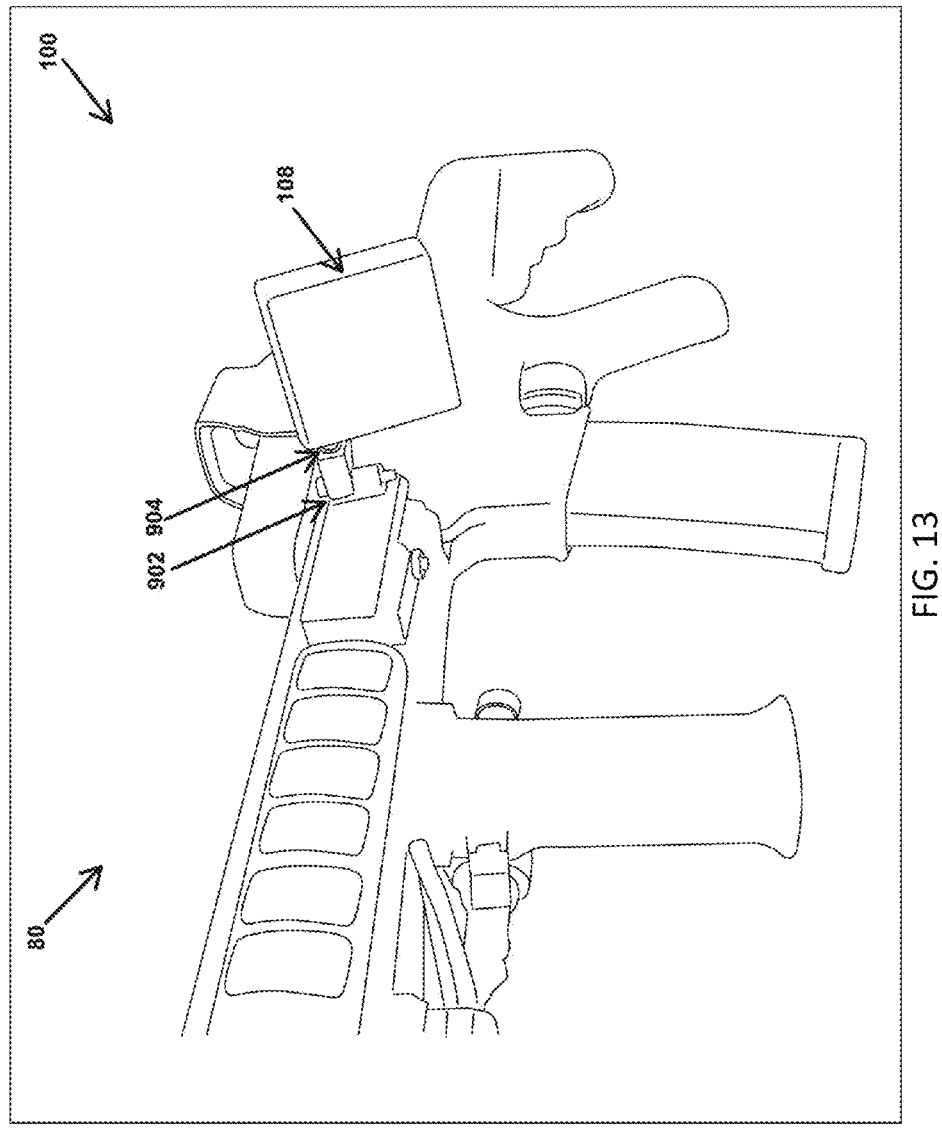
FIG. 13 is a front, perspective view of the display assembly of the example firearm-mounted camera system of FIG. 1.

FIG. 13 is a front, perspective view of display assembly 108 of an example firearm-mounted camera system 100. In this figure, display assembly 108 is rotated to a standard open position about hinge 902. In this figure, display assembly 108 is rotated around pivot point 904 to tilt up.

FIG. 14 depicts an example firearm-mounted camera system 100. FIG. 14 is a diagram depicting an example operating environment 50 in which a firearm-mounted camera system 100 can be used. The example operating environment of FIG. 14 includes a portion 52 of a building and an object O of interest.

In this example, the portion 52 of the building includes a room 66, attic 68, and obstruction 58. Attic 68 is above room 66. In this example, the obstruction includes a ceiling 64 that separates room 66 from attic 68. In this example, ceiling 64 also includes an open access panel 70 permitting access from room 66 to attic 68.

The user U is located in room 66. The object O of interest, such as an armed adversary, is in attic 68 and is obstructed from the view of user U by ceiling 64. To improve situational awareness, it is desirable for the user to know whether or not an object O of interest is present in the attic 68 to permit the user to react accordingly. The graphical depiction B in FIG. 14 illustrates the view from the perspective of the user U in the illustrated scenario.

When the firearm-mounted camera system 100 is utilized in the manner shown in FIG. 14, the user approaches the open access panel 70 and positions the firearm-mounted camera system 100 so that the camera 110 of camera assembly 104 extends above ceiling 64. Upon doing so, the image detected by the camera 110 is displayed as the visual representation 114B on display assembly 108. An image of the object O of interest is also detected by the camera 110 and included in the visual representation 114B. Visual representation 114B shows the image detected by the camera after it has been reoriented based on the orientation of the gun as detected by the accelerometer. For illustrative purposes, graphical depiction B also includes internal representation 114A, which shows the image detected by the camera before it is reoriented. In this way, the user is alerted to the presence of the object O and may react accordingly.

Figure 15:
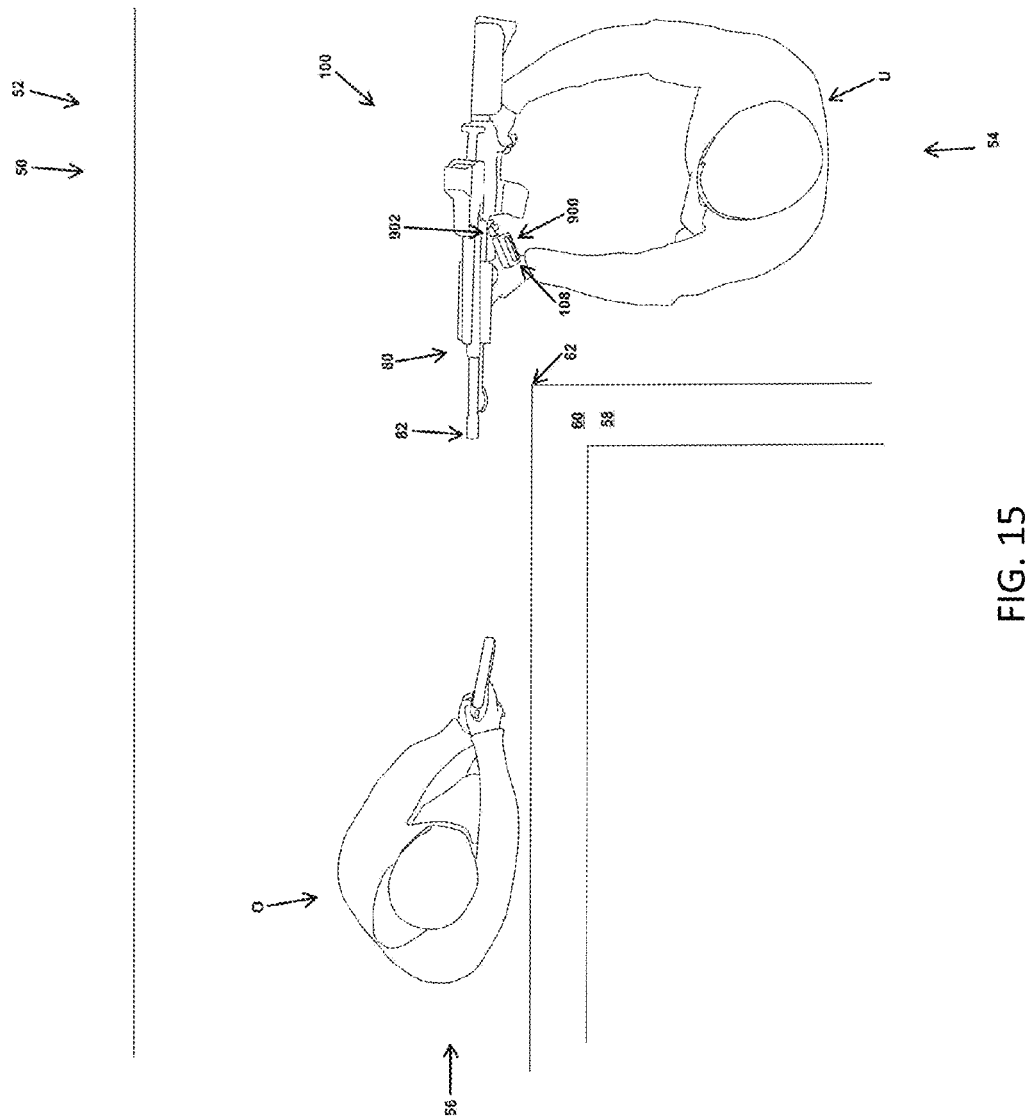
FIG. 15 is a diagram depicting another example operating environment in which a firearm-mounted camera system can be used to fire around an obstruction.

FIG. 15 is a diagram depicting an example operating environment 50 in which a firearm-mounted camera system 100 can be used to fire around an obstruction 58. The example operating environment of FIG. 15 includes a portion 52 of a building, a user U of the firearm-mounted camera system 100, and an object O of interest.

In this example, the portion 52 of the building includes a passageway 54, passageway 56, and obstruction 58. The user U is located in passageway 54, while the object O of interest, such as an armed adversary, is located in passageway 56. The object O of interest is obstructed from the view of user U by an obstruction 58. In this example, the obstruction includes a wall 60 that terminates at a corner 62.

When the firearm-mounted camera system 100 is utilized in the manner shown in FIG. 15, the user U approaches the end of the obstruction at corner 62 and positions the firearm-mounted camera system 100 so that the muzzle 82 is extended past the corner 62 and pointed into passageway 56. In this figure, display assembly 108 is rotated about hinge 902 into the fully open position so that screen 900 may be viewed from the side of the firearm. User U is holding the firearm from the side and, accordingly, may view screen 900. In this manner, user U may aim and, if necessary, fire firearm 80 around a corner without stepping into passage 56.

Figure 16:
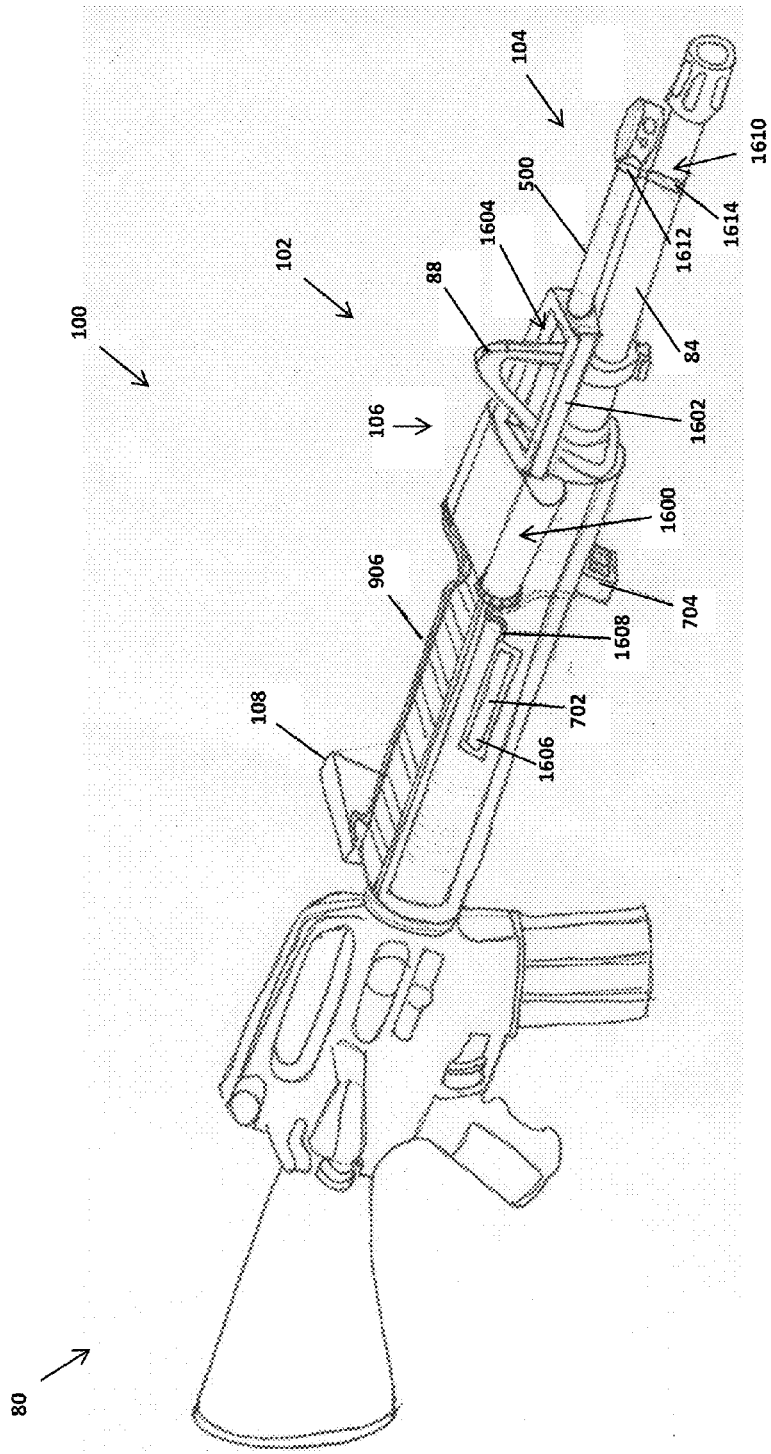
FIG. 16 is perspective view of another example firearm-mounted camera system.

FIG. 16 is perspective view of an example firearm-mounted camera system 100. As has been previously described, the firearm-mounted camera system 100 includes firearm 80 and a camera system 102.

In this embodiment, camera system 102 does not include a foregrip. Instead, camera system 102 is mounted on top of firearm 80. In other embodiments, camera system 102 is mounted on the side of firearm 80. Another alternative is that camera system 102 is mounted at an angle between one of the sides and the bottom or the top of firearm 80. In this manner, camera system 102 does not occupy the bottom of firearm 80, and the bottom of firearm 80 may be used to support other accessories, such as a grenade launcher.

As has been previously described, the camera system 102 includes camera assembly 104, switching mechanism 106, and display assembly 108. In this embodiment, switching mechanism 106 includes housing 1600, frame 1602, aperture 1604, and camera switch 702.

Housing 1600 is a hollow shell formed from plastic, metal, rubber, or any other suitable material and is configured to contain power supply 706 and control board 700. In some embodiments, housing 1600 contains additional elements. Housing 1600 is described in more detail in FIGS. 17-18.

Frame 1602 is a U-shaped structure. Frame 1602 is secured to housing 1600 and together housing 1600 and frame 1602 form aperture 1604. In some embodiments, frame 1602 is formed from three hollow beams that have square-shaped cross sections. In some embodiments, the hollow beams meet at a ninety-degree angle. In other embodiments, frame 1602 is formed from a single hollow beam that is bent or curved. In some embodiments, the hollow beams have a round or oval cross section. Frame 1602 is formed from hollow beams so that wires may run through frame 1602 to beam 500 to connect camera assembly 104 to switching mechanism 106.

Aperture 1604 is an opening through which front sight 88 of firearm 80 may protrude. In this manner, camera system 102 does not interfere with the operation of front sight 88.

In the embodiment shown, camera switch 702 is implemented as multiple momentary switches. For example, the embodiment shown in FIG. 16 includes two momentary switches, momentary switch 1606 on the right side of firearm 80 and another momentary switch on the left side of firearm 80 (not shown). Momentary switch 1606 is engaged only while it is being actuated (e.g., touched, pressed down, etc.). Momentary switch 1606 is mounted on the right side of firearm 80. Momentary switch 1606 is electronically connected to control board 700 via switch cable 1608. Although not shown, a second momentary switch is mounted on the left side of firearm 80 and is also electronically connected to control board 700 via a switch cable.

As described above with respect to FIG. 7, control board 700 and camera switch 702 operate to allow the user of camera system 102 to select the image or images to be displayed on display assembly 108 from the images received by the cameras in camera assembly 104. In some embodiments, the control board displays two or more images simultaneously (e.g., by splitting the screen between images). For example, in some embodiments, multiple images are shown when multiple momentary switches are actuated concurrently.

Camera assembly 104 has already been described in detail in FIGS. 3-5. In the embodiment shown in FIG. 16, beam 500 of camera assembly 104 is secured to frame 1602. Camera assembly 104 is further secured to firearm 80 with securing assembly 1610. Securing assembly 1610 includes a first ring 1612 and a second ring 1614. First ring 1612 is coupled to second ring 1614. First ring 1612 is secured around the distal end of beam 500. Second ring 1614 fits over the end of barrel 84 of firearm 80 (similar to a bayonet). In some embodiments, the inner diameter of second ring 1614 is larger than the outer diameter of barrel 84 so that securing assembly 1610 may be slipped over the end of barrel 84. In some embodiments, first ring 1612 and second ring 1614 are formed from a rigid material and include a tightening mechanism. In other embodiments, first ring 1612 and second ring 1614 are formed from a material with elastic properties. Other embodiments are possible as well.

Display assembly 108 has already been described in detail in FIGS. 9-13. Display assembly 108 is electronically connected to switching mechanism 106 by cable 906. In other embodiments, display assembly 108 communicates with switching mechanism 106 by wireless radio frequency communication or optical communication via beam or fiber.

Figure 17:
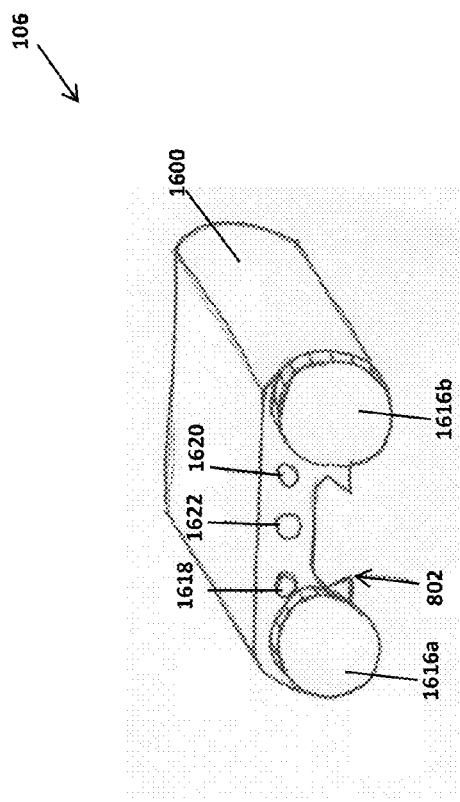
FIG. 17 is a rear, perspective view of the housing of the switching mechanism of the firearm-mounted camera system of FIG. 16.

FIG. 17 is a rear, perspective view of housing 1600 of an embodiment of switching mechanism 106. In some embodiments, switching mechanism 106 includes mounting fixture 802, battery tube access caps 1616a-b, left switch connector port 1618, right switch connector port 1620, and video connector port 1622.

In this embodiment, mounting fixture 802 is an indentation in the bottom surface of housing 1600 that is configured to couple with a rail mount on a firearm. In some embodiments, mounting fixture 802 is configured to couple directly to a firearm. In yet other embodiments, mounting fixture 802 is configured to couple to another type of mount for a firearm. Further, in some embodiments, housing 1600 is integrally formed with firearm 80. Yet other embodiments are possible as well.

Battery tube access caps 1616a-b are flat, round caps that are configured to couple with housing 1600 to seal access to the interior of housing 1600. In some embodiments, battery tube access caps 1616a-b have threads and are configured to be twisted on or off. In other embodiments, battery tube access caps 1616a-b are configured to be pushed on and pulled off. Other embodiments are possible as well. Battery tube access caps 1616a-b provide access to the interior of housing 1600 so that batteries may be replaced. Although the embodiment shown in FIG. 17 includes two battery tube access caps, other embodiments with more or fewer battery access caps are possible as well.

Left switch connector port 1618 is a port in housing 1600 that is configured to receive the plug of a cable that is connected to a switch on the left side of the firearm. Right switch connector port 1620 is a port in housing 1600 that is configured to receive the plug of a cable that is connected to a switch on the right side of the firearm. Video connector port 1622 is a port in housing 1600 that is configured to receive the plug of a cable that is connected to display assembly 108. In some embodiments, left switch connector port 1618, right switch connector port 1620, and video connector port 1622 are electronically connected to control board 700.

Figure 18:
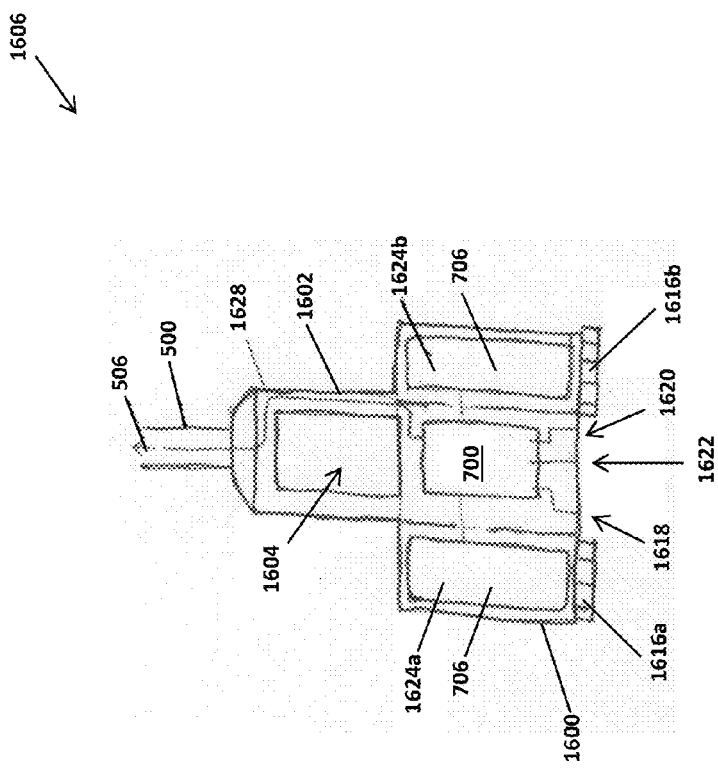
FIG. 18 is a top, cross-sectional view of the housing of the switching mechanism of the firearm-mounted camera system of FIG. 16.

FIG. 18 is a top, cross-sectional view of an embodiment of switching mechanism 106. Switching mechanism 106 includes power supply 706.

In this embodiment, power supply 706 includes batteries 1624a-b. Batteries 1624a-b are devices that convert stored chemical energy into electrical energy. In some embodiments, batteries 1624a-b are rechargeable batteries (e.g., nickel metal hydride, lithium ion, etc.). In some other embodiments, power supply 706 may include more or fewer batteries. Further in some embodiments, power supply 706 may not include batteries at all.

In some embodiments, switching mechanism 106 is connected to cable 506. In some embodiments, cable 506 is connected to control board 700 and to camera assembly 104. In some embodiments, cable 506 operates to direct electronic signals representing images received from camera assembly 104 to control board 700. In some embodiments, cable 506 further operates to direct electronic control signals from control board 700 to camera assembly 104. Further, in some embodiments, cable 506 operates to carry power from control board 700 or power supply 706 to camera assembly 104. Cable 506 is routed through housing 1600 and into channel 1628 of frame 1602. Channel 1628 is formed in the hollow space inside of the beam or beams that comprise frame 1602. In this manner, cable 506 is routed around aperture 1604 and front sight 88.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A camera system for a firearm comprising:
a camera assembly including a plurality of cameras fixedly oriented in a plurality of different directions, the plurality of cameras configured to generate a plurality of image signals;
a display assembly including a display panel;
a mounting fixture secured to the camera assembly, the mounting fixture configured to be removably attached to a firearm, wherein the camera assembly is secured to the mounting fixture with a beam, the beam extending from the mounting fixture towards a muzzle of the firearm; and
a switch configured to select between the plurality of cameras to display one of the plurality of image signals on the display panel.

2. The camera system of claim 1, wherein the camera assembly includes an enclosure, the enclosure including a surface and optical path portions configured to permit the passage of light, the plurality of cameras being disposed within the housing and oriented to capture images through the optical path portions.

3. The camera system of claim 1, wherein the camera assembly further includes an infrared emitter, the infrared emitter being configured to emit infrared light into a field of view of at least one of the cameras of the plurality of cameras.

4. The camera system of claim 1, wherein the plurality of cameras are digital video cameras and the plurality of image signals are video image signals.

5. The camera system of claim 1, further comprising a foregrip configured to be mounted on the firearm and used to control the firearm, wherein the switch is disposed on the foregrip such that a user may actuate the switch while holding the foregrip.

6. The camera system of claim 1, wherein the switch comprises a plurality of touch switches configured to be disposed on the surface of the firearm.

7. The camera system of claim 1, further comprising a second mounting fixture, the second mounting fixture being configured to be removably attached to the firearm, wherein the second mounting fixture is secured to the display assembly.

8. The camera system of claim 1, wherein the display assembly includes a power supply.

9. The camera system of claim 1, wherein the mounting fixture is configured to be removably attached to a picatinny rail of the firearm.

10. The camera system of claim 1, further comprising orientation-sensing technology, wherein the selected image signal is reoriented based on a signal from the orientation-sensing technology.

11. The camera system of claim 1, further comprising a second switch configured to cause multiple image signals to be display simultaneously on the display panel.

12. A camera and firearm assembly comprising:
a firearm having a muzzle;
a camera assembly secured to the firearm and including at least three cameras oriented in a plurality of different directions, each of the cameras generating a video signal;
a mounting fixture secured to the camera assembly, the mounting fixture removably attached to the firearm, wherein the camera assembly is secured to the mounting fixture with a beam, the beam extending from the mounting fixture towards the muzzle of the firearm
a switch, the switch being configured to select one of the video signals; and
a display panel secured to the firearm and configured to display the selected one of the video signals.

13. The camera and firearm assembly of claim 12, wherein each of the cameras is fixedly oriented in a different direction relative to the other cameras in the plurality of cameras.

14. The camera and firearm assembly of claim 12, wherein the switch is integral with a foregrip configured to be mounted on the firearm and used to control the firearm such that a user may actuate the switch while holding the foregrip.

15. A method of improving situational awareness for a user of a firearm, the method comprising:
activating a firearm-mounted camera system including a display panel and a plurality of cameras fixedly oriented in a plurality of different directions, the cameras being positioned about the forward end of a firearm by a mounting fixture and a beam, the mounting fixture being removably attached to the firearm, and the beam extending from the mounting fixture towards a muzzle of the firearm;

receiving a switch input from a user selecting one of the cameras;

generating an image of a portion of an environment with the selected one of the cameras; and displaying the image of the portion of the environment on the display panel to alert the user to conditions in the portion of the environment.

16. The method of claim 15, further comprising:

receiving a second switch input from the user selecting a second one of the cameras;

generating a second image of a second portion of the environment with the second selected one of the cameras; and displaying the second image of the second portion of the environment on the display panel to alert the user to conditions in the second portion of the environment.

17. The method of claim 15, wherein the plurality of cameras are digital video cameras.

18. The method of claim 15, wherein the plurality of cameras comprises at least three cameras.

19. A camera system for a firearm comprising:

a camera assembly including a plurality of cameras fixedly oriented in a plurality of different directions, the plurality of cameras configured to generate a plurality of image signals;

a display assembly including a display panel;

a mounting fixture secured to the camera assembly, the mounting fixture configured to be removably attached to a firearm;

a switch configured to select between the plurality of cameras to display one of the plurality of image signals on the display panel; and orientation-sensing technology, wherein the selected image signal is reoriented in the display panel based on a signal from the orientation-sensing technology.

* * * * *